UNITED STATES PATENT OFFICE 2,647,095

ALKYD RESIN

Carl J. Opp and Raymond E. Werner, Cincinnati, Ohio, assignors to Interchemical Corporation, New York, N. Y., a corporation of Ohio No Drawing. Application July 12, 1951,
Serial No. 236,480

4 Claims. (Cl. 260—26)

This invention relates to the preparation of modified alkyd resins.

Modified alkyd resins are among the most versatile of all resin types and many have found great commercial utility. Among the most useful of the modified alkyds, are the drying oil-modified alkyds, the non-drying oil-modified alkyds and rosin acids modified alkyds. Incorporation of 25 per cent or more of such oils or the fatty acids from such oils or rosin, into alkyds overcomes the inherent brittleness of the pure alkyd and gives a resin suitable for use in protective and decorative finishes. One such use for oil-modified alkyds or rosin modified alkyds is in blends with Beetle type resins, such as urea-formaldehyde and melamine formaldehyde resins for use as baking enamels. Advantages obtained are increased hardness and mar resistance and the finish may be baked at high temperatures without danger of discoloration.

The present invention has as one of its main objects the production of a novel type of modified alkyd resin particularly characterized by containing relatively large amounts of copolymerized methyl methacrylate or styrene. These modified alkyds are particularly characterized by being readily compatible with urea-formaldehyde and melamine-formaldehyde resins. This property of the novel resins makes them particularly useful in the preparation of protective and decorative coatings.

The modified alkyds of the present invention are prepared by first heating a mixture of styrene monomer or methyl methacrylate monomer with the desired proportion of rosin, in the presence of a peroxide catalyst and an alkyl mercaptan having at least four carbon atoms according to the procedure covered by our copending application, Serial Number 713,932, filed December 4, 1946, to form a methyl methacrylate or styrene rosin copolymer.

The copolymer is then converted to an alkyd resin by reacting it with polyhydric alcohol, e. g. glycerol or pentaerythritol, and polycarboxylic acid; e. g. phthalic acid, maleic acid, sebasic acid and Petrex acid (condensation product of maleic anhydride and terpene).

It will be obvious to those skilled in the art of preparing modified alkyds that the particular procedure used to prepare alkyds according to our invention may vary from one preparation to another and will depend for the most part on the particular starting materials employed.

We know of no limitations on the ratios of methyl methacrylate copolymer or styrene copolymer and polyhydric alcohol and polybasic-carboxylic acid which may be reacted to give the novel products of our invention. Hence, the ratios of the various reactants used will be governed by the properties which will be desired in the alkyd. To those experienced in the art of cooking alkyds resin it will be obvious that our process can be used to prepare alkyd resins having a wide variety of properties. For example, large ratios of a 60:40 methyl methacrylate-rosin copolymer would tend to give an alkyd having more pronounced properties resulting from methyl methacrylate copolymer than an alkyd containing small ratios of the methyl methacrylate copolymer.

The alkyd portion of our resins may be formed from any of the commonly used polyhydric alcohols and polybasic carboxylic acids. Polyhydric alcohols, such as ethylene glycol, diethylene glycol, glycerol or pentaerythritol are preferred because they are more readily available than other polyhydroxy alcohols, such as mannitol, sorbitol and the like. Similarly, such readily available polybasic carboxylic acids as phthalic, citric, maleic, fumaric, sebasic, azelaic, adipic, itaconic and Petrex acids (Hercules Powder Co.) are prepared to the less readily available acids.

The invention will be more fully understood by reference to the following examples in which the parts are by weight.

*Example I.—30:70 styrene rosin copolymer*

| | Parts |
|---|---|
| Rosin | 1050 |
| Styrene | 450 |
| t-Butyl mercaptan | 22 |
| t-Butyl hydroperoxide | 18 |

The above ingredients were heated under reflux with means for removing any water formed. The heating was continued, up to as high as 500° F., until an acid number of 112 was obtained. Total cooking time was 3.5 hours and the yield of product having a M. P. of 49° C. (Bar) was 1500 parts.

*Example II.—40:60 styrene rosin copolymer*

| | Parts |
|---|---|
| Rosin | 600 |
| Styrene | 400 |
| Amyl mercaptan | 20 |
| t-Butyl hydroperoxide | 15 |

The ingredients were reacted in a manner similar to that of Example I to obtain a copolymer having a melting point of 50° C. and an acid number of 95.

Example III.—50:50 styrene rosin copolymer

| | Parts |
|---|---|
| Rosin | 750 |
| Styrene | 750 |
| Amyl mercaptan | 38 |
| t-Butyl peroxide | 30 |

The copolymer was prepared according to procedure of Example I to give a clear, hard, brittle, light, colored resin having a melting point of 55° C. and an acid number of 81.

Example IV.—40:60 methyl methacrylate rosin copolymer

| | Parts |
|---|---|
| Rosin | 900 |
| Methyl methacrylate | 600 |
| t-Butyl mercaptan | 38 |
| t-Butyl hydroperoxide | 30 |

The rosin was heated in a flask at 350° F. under reflux and agitation while the other three ingredients were added below the liquid surface of the rosin at such a rate as to maintain a steady reflux. The temperature is then gradually increased to 450° to 500° F. to complete the copolymerization and obtain a product having an acid number of 96 to 98. The copolymer was clear when hot, but had a milky appearance when cooled to room temperature. Similar copolymers are obtained from 30:70 and 50:50 ratios of methyl methacrylate to rosin.

All of the above copolymers can be used in making modified alkyd resins in accordance with the invention. The modified alkyds are compatible with melamine-formaldehyde and urea-formaldehyde resin. The following examples are typical of alkyd resins made from the above copolymers.

Example V

| | Parts |
|---|---|
| 40:60 styrene rosin copolymer (Example II) | 900 |
| Glycerol | 240 |
| Phthalic anhydride | 360 |

The above ingredients were reacted by heating at 450° F. in carbon dioxide atmosphere until an acid number of 12 or less was obtained and then cooled to 400° F. and reduced to 60% total non-volatile components with xylol. The alkyd contains 25% styrene and 36% rosin acids.

Example VI

| | Parts |
|---|---|
| 40:60 methyl methacrylate rosin copolymer (Example IV) | 626 |
| Glycerol | 174 |
| Phthalic anhydride | 200 |

The procedure was similar to that of Example V to give a resin having a viscosity of Q–R (Gardner) when reduced to 60% total non-volatiles with a 3:1 mixture of xylol and Cellosolve (monoethyl ether of ethylene glycol). This resin contains 25% methyl methacrylate modification, 38% of rosin acids, and has a COOH to OH ratio of 5:75.

Similar alkyds are obtained using copolymers containing other ratios of styrene or methyl methacrylate to rosin. In order that the styrene or methyl methacrylate show appreciable effect on the properties of the alkyd, the copolymer should contain at least about 10% of the styrene or methyl methacrylate. Similarly, rosin should constitute at least about 10% of the copolymer.

This application is a continuation-in-part of our copending application Serial No. 713,932, filed December 4, 1946, now Patent No. 2,560,592.

We claim:

1. An alkyd resin comprising the reaction product of a polybasic carboxylic acid, a polyhydric alcohol, and the copolymerization product of rosin with a monomer of the class consisting of styrene and methyl methacrylate in the presence of a peroxide catalyst and an alkyl mercaptan having at least four carbon atoms, said alkyd resin being compatible with urea-formaldehyde and melamine-formaldehyde resins.

2. An alkyd resin comprising the reaction product of a polybasic carboxylic acid, a polyhydric alcohol, and the copolymerization product of rosin with styrene in the presence of a peroxide catalyst and an alkyl mercaptan having at least four carbon atoms, said alkyd resin being compatible with urea-formaldehyde and melamine-formaldehyde resins.

3. An alkyd resin comprising the reaction product of a polybasic carboxylic acid, a polyhydric alcohol, and the copolymerization product of rosin with methyl methacrylate in the presence of a peroxide catalyst and an alkyl mercaptan having at least four carbon atoms, said alkyd resin being compatible with urea-formaldehyde and melamine-formaldehyde resins.

4. A method for preparing an alkyd resin comprising heating at esterification temperatures, a polybasic carboxylic acid, a polyhydric alcohol, and the copolymerization product of rosin with a member of the class consisting of methyl methacrylate and styrene in the presence of a peroxide catalyst and an alkyl mercaptan having at least four carbon atoms, such alkyd being compatible with urea-formaldehyde and melamine-formaldehyde resins.

CARL J. OPP.
RAYMOND E. WERNER.

References Cited in the file of this patent

UNITED STATES PATENTS

| Number | Name | Date |
|---|---|---|
| 2,574,753 | Opp et al. | Nov. 13, 1951 |